US006360245B1

(12) United States Patent
Amstad et al.

(10) Patent No.: US 6,360,245 B1
(45) Date of Patent: Mar. 19, 2002

(54) COMPUTERIZED COMMUNICATION SYSTEM FOR VOICE AND DATA SERVICES

(75) Inventors: Kurt Amstad, Bülach; Eugen Rippstein, Aesch, both of (CH)

(73) Assignee: Siemens Schweiz AG, Zurich (CH)

( * ) Notice: Subject to any disclaimer, the term of this patent is extended or adjusted under 35 U.S.C. 154(b) by 0 days.

(21) Appl. No.: 09/147,173
(22) PCT Filed: May 13, 1997
(86) PCT No.: PCT/CH97/00186
§ 371 Date: Oct. 22, 1998
§ 102(e) Date: Oct. 22, 1998
(87) PCT Pub. No.: WO97/43849
PCT Pub. Date: Nov. 20, 1997

(30) Foreign Application Priority Data

May 15, 1996 (CH) .............................................. 1237/96

(51) Int. Cl.⁷ .............................................. G06F 15/16
(52) U.S. Cl. ..................... 709/200; 709/202; 709/203; 709/206; 709/238; 709/249; 709/250; 370/338; 370/400; 455/428; 455/554; 455/555
(58) Field of Search ................................. 709/200–203, 709/206–207, 217–219, 238–239, 242, 246, 249–250; 370/338, 400–401; 455/412, 428, 461–465, 553–555, 557, 560–561; 379/88.13–88.14, 88.17–88.18; 713/200–201, 100; 235/374–380

(56) References Cited

U.S. PATENT DOCUMENTS

| | | | | |
|---|---|---|---|---|
| 5,530,740 A | * | 6/1996 | Irribarren et al. | 379/88.17 |
| 5,647,002 A | * | 7/1997 | Brunson | 709/206 |
| 5,742,905 A | * | 4/1998 | Pepe et al. | 455/461 |
| 5,854,897 A | * | 12/1998 | Radziewicz et al. | 709/224 |
| 5,884,046 A | * | 3/1999 | Antonov | 709/238 |
| 6,006,018 A | * | 12/1999 | Burnett et al. | 709/219 |
| 6,039,245 A | * | 3/2000 | Symonds et al. | 709/246 |
| 6,088,338 A | * | 7/2000 | Rossella et al. | 455/464 |
| 6,237,092 B1 | * | 5/2001 | Hayes, Jr. | 709/221 |

FOREIGN PATENT DOCUMENTS

CA 2122778 11/1994 ............ H04B/7/26

* cited by examiner

Primary Examiner—Zarni Maung
Assistant Examiner—Bharat Barot
(74) Attorney, Agent, or Firm—Herbert L. Lerner; Laurence A. Greenberg; Werner H. Stemer

(57) ABSTRACT

The computer controlled communication system has communication devices (KE1, . . . , KEn) and has data devices (DE1, . . . , DEn) that are connected to a network server (SR) via a local network (LAN), of which devices at least one communication device (KE1, . . . , KEn) and one data device (DE1, . . . , DEn) are respectively associated with a user and are functionally coupled in order to fulfill technical communication performance characteristics. Via a technical communication interface subassembly (VBT), the communication devices (KE1, . . . , KEn) are connected to the network server (SR), which is connected to an open or private switching center (PBX) via a transit switch (ISDN-A/Q), which network server has a gateway (GW) to couple the local network (LAN) to the communication network (ISDN). In the communication system according to the invention, it is particularly advantageous that the open or private switching center (PBX) is connected to the network server (SR) and consequently to the entire communication system via only one line, e.g. a primary rate connection. Since the data devices or PCs (DE1, . . . , DEn) and the communication devices (KE1, . . . , KEn) are connected to the network server (SR), the connecting cables can be laid in common conduits, by means of which a lower cost is produced for the networking of the devices (DE, KE). All technical communication data of the computer controlled communication system can be stored up in the network server (SR) and can be called up from it.

11 Claims, 2 Drawing Sheets

COMPUTERIZED COMMUNICATION SYSTEM FOR VOICE AND DATA SERVICES

BACKGROUND OF THE INVENTION

1. Field of the Invention

The present invention relates to a computer controlled communication system according to the preamble to claim 1.

2. Discussion of Background Information

Modern telephone systems, in particular ISDN communication systems, permit the user to employ various services (e.g. phone, teletex, fax, videotex, and data transmission). The integration of these services has lead to the development of devices, which give the user access to various services. A multi-functional terminal for vocal, text, image, and data communication is described in K. P. Mellwig & W. Wilde, Das universelle Multidevice HICOM 3510, ISDN im Büro [The Universal HICOM 3510 Multi-device, ISDN in the Office], Siemens AG, München 1985, ISBN 3-8009-3846-4, pp. 44–49. Terminals of this type are normally not suited to replace a personal computer (PC below), of the kind currently employed for complex uses in the office (e.g. user-friendly word processing systems or high-performance graphics and database systems). Communication devices in the office are therefore often used independently of the data devices. Occasionally, PCs are also connected to private branch exchanges via special interface subassemblies. The large expenditure required for equipping all PCs with corresponding interface subassemblies is disadvantageous. Furthermore, the communication device connected to the PC is not operational when the PC is switched off.

Therefore in WO 94/21901, the systems provided for data processing are integrated into an intelligent telephone system. This telephone system is directly connected to the telephones for which no multiple functions are required and which also remain operational when the integrated EDV system is not in operation. The telephone system is connected to a network (LAN) via an integration element, which contains a computer and an ISDN interface subassembly among other things, to which network a network server and a number of PCs are connected. As soon as a device is called, the integration element and the network produce a connection to a PC, which is associated with the device that has been called. For example, all existing data regarding the calling party is transmitted from the computer of the integration element to the PC and is displayed there.

In this embodiment, it is disadvantageous that a computer (integration element) must be connected between the telephone system and the network, which element accesses the PCs, which are connected to the network, in parallel fashion or via the network server already provided. Technical communication functions selected on the PC (broker's call, conference call, etc.) must be respectively transmitted via the integration element to the telephone system and executed there. The integration element or the computer must undergo maintenance just like the network server. Furthermore with software adaptations, attention must be respectively paid that the compatibility between the integration element and the network server is maintained. The system disclosed in WO 94/21091 is therefore relatively complex. When problems arise, the telephone system, the devices, the integration element, the network server, and the PCs, as well as the connecting lines associated with them must be checked. The maintenance of data and programs has to be carried out for both the integration element and the network server.

SUMMARY OF THE INVENTION

The object of the present invention, therefore, is to produce an easily maintainable computer controlled communication system at a low cost and using existing resources, which permits the interaction of telephone devices and associated PCs.

This object is attained by the measures disclosed in the characterizing part of claim 1. Advantageous embodiments of the invention are disclosed in the other claims.

The invention is based on the knowledge that the prior art of modern network embodiments permits the solution of existing communication problems. The EDV systems are therefore not integrated into a communication system. In lieu of these, the EDV system is expanded by the necessary technical communication performance characteristics. As a result, the structure of the communication system is greatly simplified in comparison to the known embodiments (WO 94/21091). An integration element between the telephone system and the network (LAN) or the network server is no longer necessary. An existing network with a network server and PCs can be expanded into a communication system according to the invention at a low cost.

BRIEF DESCRIPTION OF THE DRAWINGS

By way of example, the invention is explained in detail below in conjunction with a drawing.

DETAILED DESCRIPTION OF THE PRESENT INVENTION

Figure 1:
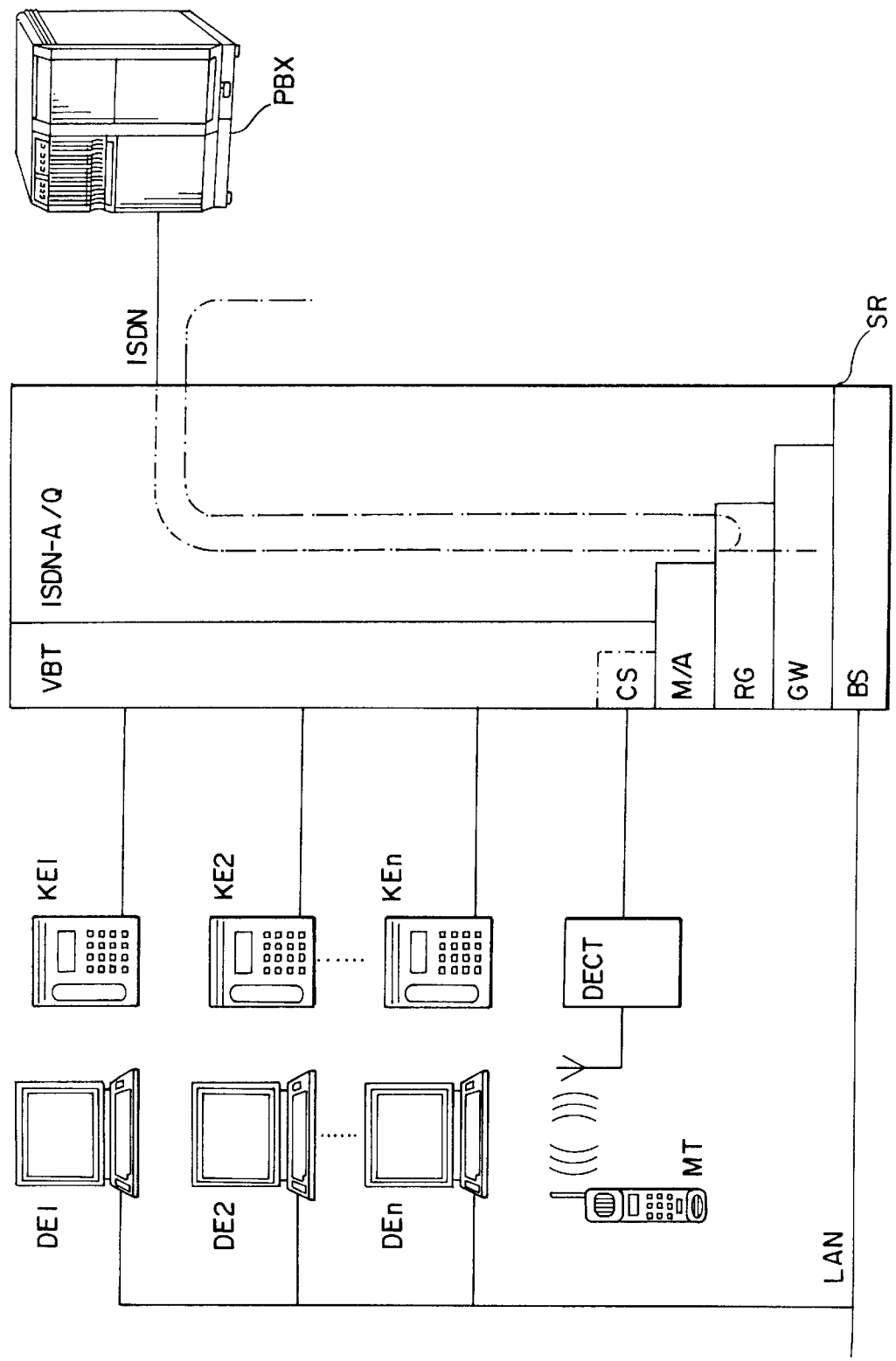
FIG. 1 shows a computer controlled communication system according to the invention.

FIG. 1 shows a network server SR, which is connected to PCs DE1, . . . , DEn via a network LAN and is connected to a private branch exchange PBX or the office via a transit switch ISDN-A/Q. Furthermore, the communication devices KE1, . . . , KEn, which are associated with the PCs DE1, . . . , DEn and preferably only have the real time functions required for telephoning, are connected to the network server SR via a technical communication interface subassembly VBT. A technical communication interface subassembly VBT of this kind has been disclosed, for example, by WO 94/08430.

Figure 2:
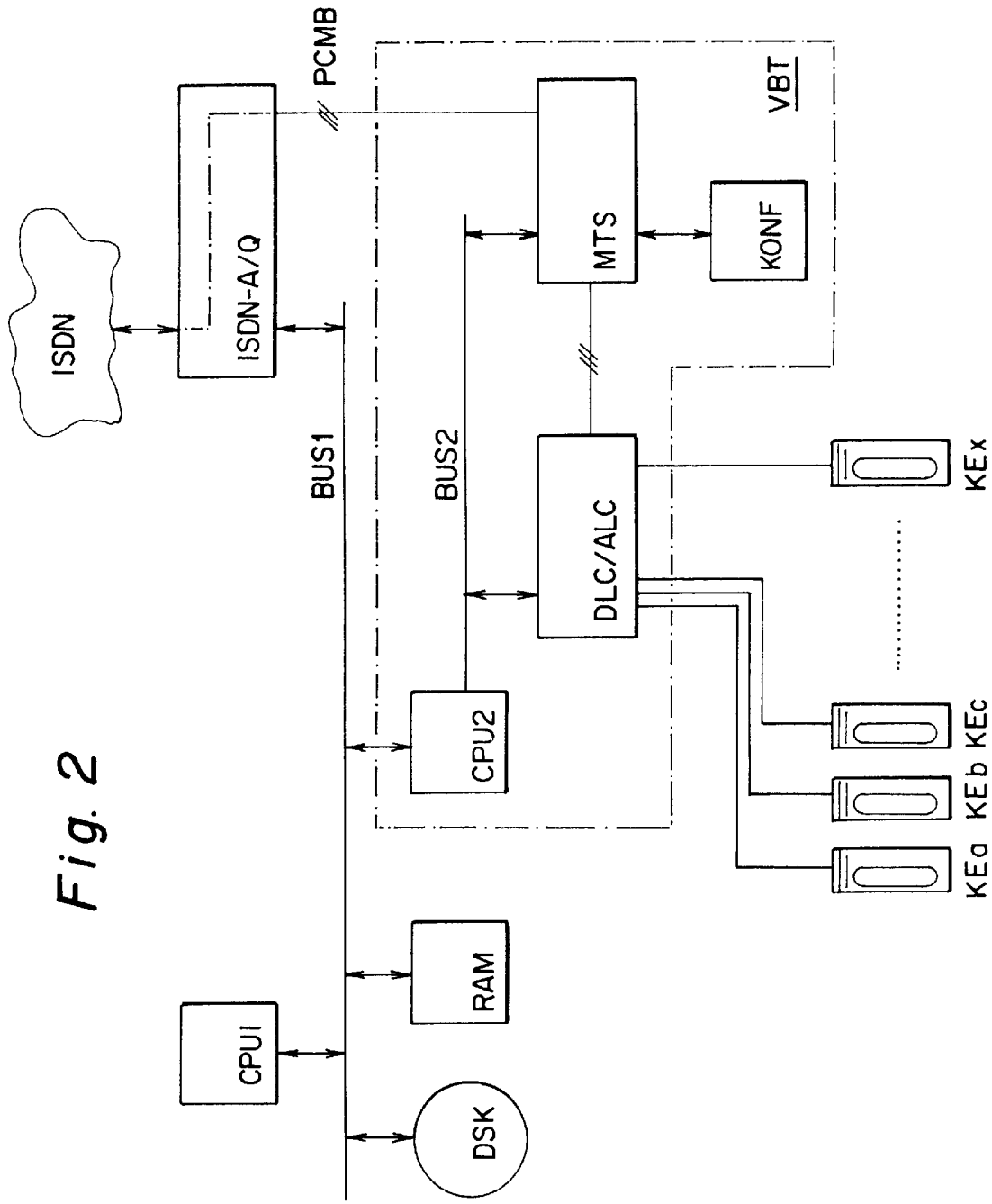
FIG. 2 is a view into the architecture of the communication system.

As shown in FIG. 2, the interface subassembly VBT controlled by the processor CPU1 of the network server SR has a coupling multiple MTS (memory time switch), by which the time slots of a line PCMB are transposed in accordance with the selected connections. For example, at least one MTSC component PEB2045 from Siemens is used as the coupling multiple MTS and respectively has eight PCM inputs and eight PCM outputs. In order to produce conferences, preferably a conference component KONF (e.g. an M116 from SGS) is provided, which is looped via the coupling multiple MTS and presents the possibility of mixing all the time slots of the line PCMB arbitrarily. Using the technical communication application of his PC, the user can therefore initialize a connection with another internal or external party at the click of a mouse or, provided he is entitled, can initialize a conference connection with a number of parties.

In order to relieve the processor CPU1 of the network server SR, a second processor CPU2 is preferably provided in the technical communication interface subassembly VBT and controls the procedures of the coupling multiple MTS, the conference component KONF, and other modules (analog and/or digital subscriber connection cards DLC/ALC) that occur in real time. Additional performance characteristics can be realized by means of a signal processor.

Via a first data bus BUS1, the first processor is connected to disk and semiconductor storage units, DSK, RAM, the transit switch ISDN-A/Q, the technical communication interface subassembly VBT, as well as other modules of the server SR. On the other hand, the second processor CPU2 is connected via a second data bus BUS2 to the coupling multiple MTS and the other technical communication modules.

Therefore, the network server SR has all the communication capability required for the working process of the PC user on a common platform. All operational functions run on the PCs DE1, . . . , DEn (e.g. call routing, mailbox reading, time management, call activation, telephone book, calling journal, key programming, etc.). In order to optimally support the working processes of the users, who are possibly joined together in teams, the data applications are linked to the technical communication software. For example, in conjunction with the call number of the calling party, the associated data (e.g. client data, orders, open accounts) are called up in a database of the network server SR and displayed on the PC of the party being called. These functions are handled in the network server SR by means of an application module M/A. These measures produce an "intelligent network" as described in P. Bocker, ISDN, Das diensteintegrierende digitale Nachrichtennetz [The Service-Integrated Digital Communication Network], Springer Verlag, Berlin 1990, 3rd edition, pp. 170–173. In another server level (router) RB, routing functions are provided which assure the private branch exchange PBX access to other servers via the network server SR (as regards routing, see loc. cit. pp. 164–167). The transition from the ISDN to the local network (LAN) is carried out via a gateway point (Gateway) GW. Gateway points for private networks are described in loc. cit. on pp. 48 and 49. The operating system BS of the network server SR (e.g. UNIX) is provided on a lower level.

In lieu of a line-connected telephone device, a cordless telephone MT can also be provided, which is associated with a PC and is connected to the network server SR via a cordless server CS and a base station DECT (e.g. which operates in accordance with the DECT standard).

In the communication system according to the invention, it is particularly advantageous that the private branch exchange PBX is connected to the network server SR and consequently to the entire communication system via only one line, e.g. a primary rate connection. Errors that occur can consequently be easily isolated and remedied. Interfacing problems that can only be solved with a greater expenditure are often eliminated. When expanding the communication system, normally, no other connecting lines are required from the private branch exchange PBX to the network server SR or to the communication devices KE1, . . . , KEn. This produces the advantage, which is not to be underestimated, that the appropriate personnel for the maintenance of the communication system only have to be entrusted with the particulars of the network server SR and its user-end environment. Since the data devices or PCs DE1, . . . , DEn and the communication devices KE1, . . . , KEn are connected to the network server SR, the connecting cables can be laid in common conduits, by which a lower cost is achieved for the networking of the devices DE, KE. All technical communication data of the computer controlled communication system can be stored in the network server SR and called up from it. The integration element disclosed in WO 94/21091 and its maintenance are therefore no longer necessary.

In the operation of the communication system according to the invention, the private branch exchange PBX is hardly loaded at all since the essential technical communication performance characteristics are supplied by the network server SR. Because of this fact, though, it is important that the operation of the network server SR remains assured in every respect. It is therefore preferable to provide a continuous power supply for the network server SR.

In the drawings, the individual elements are labeled as follows:

| | |
|---|---|
| BS | operating system |
| CS | cordless server |
| DE1, . . . , DEn | data devices |
| DECT | radio station |
| GW | gateway |
| ISDN A/Q | transit switch |
| KE1, . . . , KEn | communication devices |
| LAN | local network |
| M/A | application module |
| MT | cordless telephone |
| PBX | switching center |
| RG | router |
| SR | network server |
| VBT | technical communication interface subassembly |

What is claimed is:

1. A computer controlled communication system comprising:
   a plurality of communication devices;
   a plurality of data devices;
   a network server, the plurality of communication devices and the plurality of data devices connected to the network server via a local area network, at least one of the plurality of communication devices and one of the plurality of data devices associated with a user, the at least one of the plurality of communication devices and the one of the plurality of data devices being functionally coupled to fulfill technical communication performance characteristics;
   a technical communication interface subassembly, the plurality of communication devices connected to the network server via the technical communication interface, said technical communication interface subassembly being for providing a direction of additional data services via the local area network to at least one of said plurality of communication devices and at least one of said plurality of data devices; and
   a transit switch, the technical communication interface connected to an open or private switching center via the transit switch, the open or private switching center being separate from the local area network, the network server including a gateway coupling the local are network to a communication network, said transit switch providing a listener function and switching in said technical communication interface subassembly the direction of the additional data services.

2. The computer controlled communication system according to claim 1, the plurality of communication devices comprising mobile telephones connected to the network server via one of a radio station, a cordless server, and the technical communication interface subassembly.

3. The computer controlled communication system according to claim 2, the radio station preferably functioning in accordance with a standard.

4. The computer controlled communication system according to claim 3, the standard comprising a DECT standard.

5. The computer controlled communication system according to claim 1, the network server capable of routing functions.

6. The computer controlled communication system according to claim 1, the communication devices comprising key telephone devices that preferably only have the real time functions required for telephoning.

7. The computer controlled communication system according to claim 1, an application module provided in the network server, technical communication routines being coupled with data applications in the application module.

8. The computer controlled communication system according to claim 7, the applications module comprising a database containing data records of a calling party, the data records transmitted to the data devices of the parties being called.

9. The computer controlled communication system according to claim 1, the plurality of data devices comprising personal computers.

10. The computer controlled communication system according to claim 1, wherein, during the listener function, said transit switch hears incoming calls on the open or private switching center and announces the incoming calls without affecting the open or private switching center.

11. The computer controlled communication system according to claim 1, wherein said plurality of communication devices and said plurality of data devices are synchronized in real time.

* * * * *

UNITED STATES PATENT AND TRADEMARK OFFICE
CERTIFICATE OF CORRECTION

PATENT NO.   : 6,360,245 B1
DATED        : March 19, 2002
INVENTOR(S)  : Kurt Amstad et al.

It is certified that error appears in the above-identified patent and that said Letters Patent is hereby corrected as shown below:

<u>Title page,</u>
Item [54], should read as follows:

-- COMPUTER CONTROLLED COMMUNICATION SYSTEM FOR VOICE AND DATA SERVICES --

Signed and Sealed this

Twenty-seventh Day of August, 2002

Attest:

JAMES E. ROGAN
*Attesting Officer*     *Director of the United States Patent and Trademark Office*